United States Patent

[11] 3,551,738

| [72] | Inventor | Robert G. Young<br>Nutley, N.J. |
|---|---|---|
| [21] | Appl. No. | 795,258 |
| [22] | Filed | Jan. 30, 1969 |
| [45] | Patented | Dec. 29, 1970 |
| [73] | Assignee | Westinghouse Electric Corporation<br>Pittsburgh, Pa.<br>a corporation of Pennsylvania |

[54] CONDENSER DISCHARGE LAMP CIRCUIT WITH A PULSE FORMING NETWORK AND A KEEP ALIVE CIRCUIT
7 Claims, 4 Drawing Figs.

[52] U.S. Cl............................................. 315/171,
315/173, 315/176, 315/240, 315/241, 315/244,
328/67; 331/94.5
[51] Int. Cl...................................................... H01s 3/09,
H03k 3/53; H05b 41/232
[50] Field of Search............................................. 315/160,
171, 173, 175, 176, 240, 241, 244; 328/67, 68;
313/184, 185

[56] References Cited
UNITED STATES PATENTS
| 3,430,159 | 2/1969 | Roeber.......................... | 315/241X |
| 3,465,203 | 9/1969 | Galster......................... | 315/241X |

*Primary Examiner*—James, W. Lawrence
*Assistant Examiner*—C. R. Campbell
*Attorneys*—A. T. Stratton, W. D. Palmer and D. S. Buleza ABSTRACT: Pulse operative combination discharge device and operational means therefor, which provides high light output, and superior maintenance for a long operative lifetime. The discharge device comprises a capillary arc-tube with an inert gas fill. The pulse operational means comprises a pulse operative power supply network connected to the discharge device by a fast acting, repetitively operable switching means which is controlled by means for opening and closing the switching means for predetermined repetitive periods of time, and a keep-alive reactive network and power supply connected in parallel with the discharge device for sustaining a discharge in the capillary arc-tube when the switching means is open.

PATENTED DEC 29 1970 3,551,738

WITNESSES
Theodore F. Wrobel
James F. Young

INVENTOR
Robert G. Young
BY Walter Sutcliff
ATTORNEY 3,551,738

CONDENSER DISCHARGE LAMP CIRCUIT WITH A PULSE FORMING NETWORK AND A KEEP ALIVE CIRCUIT

BACKGROUND OF THE INVENTION

The invention herein described was made in the course of or under a contract with the Department of the Army.

Xenon flash lamps are well known in the prior art. These devices range from the repetitive commercial photographic flashers to high power, very high repetitive rate specialty devices used for laser pumping. The combination of the present invention is a high power, pulse operated device, which exhibits a high maintenance of light output during its greatly extended operating lifetime. These characteristics make the present combination particularly useful for optically pumping Q-switched lasers, although its application is not limited thereto.

The principle problem with prior art, high-power pulse operative xenon discharge devices is the very short lifetime, the need for water cooling, and the poor maintenance characteristic of initial light output over even a short operating lifetime. The best known prior art device with comparable pulse power capabilities required water cooling and even then only had a usable light output lifetime measured in the terms of hours when using a conventional pulse circuit. The starting and operating voltages for the prior art devices were high and the starting or trigger voltage requirement increased excessively, in some cases within minutes of initial operation. The operating lamp voltage drop in DC operation was from 200-300 volts. The prior art pulse devices were capillary xenon discharge devices operated on a conventional pulse circuit. A capillary discharge device with a xenon gas filling and solid tungsten electrodes at opposite ends is known in the art.

SUMMARY OF THE INVENTION

It is an object of the invention to provide a high-power, repetitive, pulse operative discharge device combination having a greatly extended operating lifetime with a high maintenance of light output during lifetime.

It is another object to provide such a combination wherein the starting voltage remains relatively low during life of the discharge device, and the operating voltage drop across the discharge device is also relatively low.

It is a further object to eliminate the need for water cooling the relatively high power pulse discharge device, and to eliminate the need for applying a high voltage starting spike across the discharge device to initiate each pulse discharge.

The aforementioned objects and others which will become apparent as the description proceeds are achieved by providing a combination comprising a capillary discharge device and pulse generating means operatively connected thereto. The light transmissive capillary arc-tube contains a discharge sustaining a filling of selected inert gases, with the discharge being sustained between electrodes having an electron emissive material associated therewith in a manner which minimizes vaporization of this emission material. The pulse generating means comprises a pulse forming network and a power supply network connected via a fast acting repetitively operable switching means across the electrodes of the discharge device causing a pulsed discharge of predetermined duration. A pulse forming network included in the pulse generating means has an impedance slightly greater than the impedance of the discharge device with this impedance mismatch causing a reversal of polarity of the potential across the switching means shortly after the discharge device is pulsed thereby insuring turnoff of the switching means and termination of an individual pulse, thus permitting the pulse forming network to reenergize. Control means are provided for opening and closing the switching means in a very fast repetitive mode for predetermined periods of time. A keep-alive reactive network and power supply is connected across the discharge device for sustaining a continuous discharge at a predetermined power level in the device when the switching means is open or turned off.

DESCRIPTION OF THE PREFERRED EMBODIMENT

Figure 1:
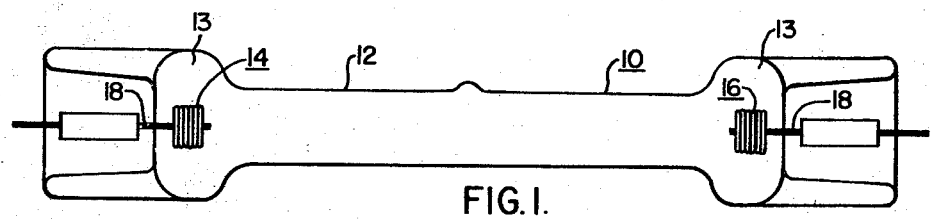
FIG. 1 shows the capillary discharge device used in the preferred embodiment of the combination.
Figure 2:
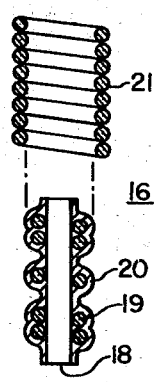
FIG. 2 is an enlarged sectional view of at least one of the electrodes, which is treated to improve its emissivity.

In the preferred embodiment shown in FIG. 1, the capillary discharge device 10 comprises an at least partially radiation transmissive capillary arc-tube 12, for example formed of quartz. By a capillary discharge device is meant one where the ratio of arc length to arc-tube diameter is very large, by way of a specific example the arc-tube dimensions are 3 mm i.d. with 50 mm arc length, which is the distance between the electrodes. The arc-tube has oversized end chambers 13 having a 6 mm i.d. The electrodes 14, 16 are preferably concentrically coiled tungsten members, with the coils formed of approximately 20 mil tungsten wire. In each case, the inner coil is tightly fitted on the inwardly projecting lead-in conductors 18. The inner coil 20 of the cathode member 16 as seen in more detail in FIG. 2, is then coated with a thin coating of a conventional electron emissive material 20 which, for example is by weight approximately 70 percent thoria, 20 percent barium oxide, 7 percent calcium oxide, and 3 percent tungsten powder. The outer coil 21 of the electrodes 14, 16 is a tungsten member tightly overlapping the coated inner coil in the case of the cathode 16, and just over the inner coil of the anode 14. This outer coil effectively covers the coating on the inner coil and thus inhibits degradation and vaporization of this material which can coat the interior wall of the arc-tube and thereby diminish the light output of the device. The lead-in conductors 18 are sealed through the end portions of the device using conventional molybdenum ribbons 22 in press seals 24.

The arc-tube is filled with selected inert gas at a pressure of from 150—1,200 torrs, and in the preferred embodiment the inert gas is xenon at a pressure of about 300 torrs.

Figure 3:
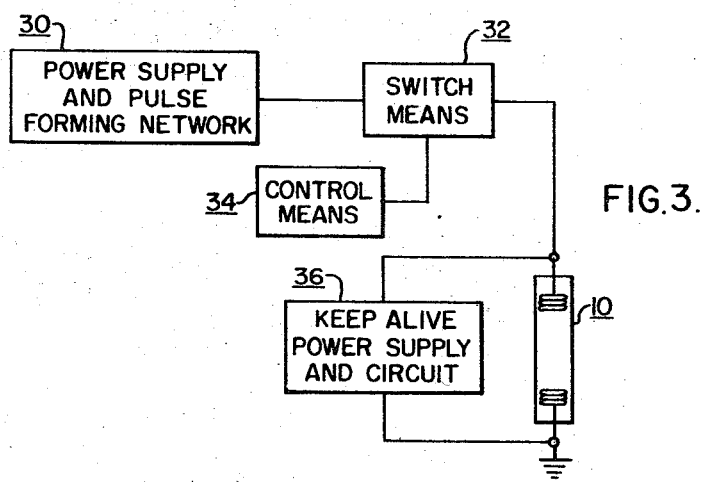
FIG. 3 is a schematic of the operational network utilizing the discharge device shown in FIG. 1.

In FIG. 3 is shown the above-described capillary discharge device 10 incorporated into a schematic diagram which illustrates the elements of the combination. The pulse generating power supply network 30 is electrically connected through the normally open switching means 32 to the anode 14 of the discharge device 10. The control means 34 is electrically connected to the gate of the switching means 32, which in the preferred embodiment is a silicon controlled rectifier element. The control means 34 causes the SCR to become conductive thus closing the switching means for predetermined periods, and for a predetermined number of times per second. The keep-alive power supply and network 36 is electrically connected across the discharge device 10 to insure that a predetermined minimum current is constantly passed through the discharge device 10 to provide a level of ionization in the discharge device which facilitates the formation of the pulse discharge at reasonable starting voltages at the beginning of the pulses.

Figure 4:
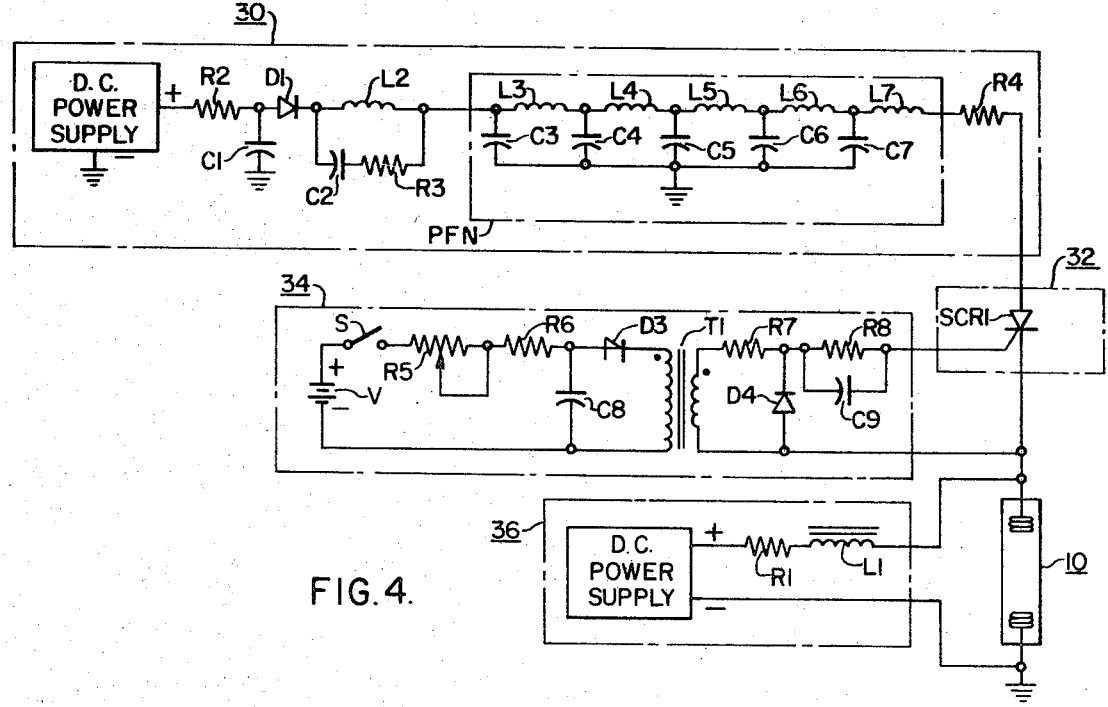
FIG. 4 is a detailed diagram of the operational network.

The combination is shown in detail diagrammatically in FIG. 4, wherein the above-mentioned keep-alive network 36 comprises the conventional DC power supply 40 series resistor R1, having a value of for example 2000 ohms, and the series inductor L1, which is a standard iron core fluorescent lamp ballast, having an inductance of about 0.5 henry. This network is connected across the discharge device and a steady-state current of preferably 100 ma. is established.

The pulse power supply network 30 comprises a standard DC high voltage power supply 42, and in series with the high voltage output terminal is resistor R2, having a value of 100 ohms and capacitor C1, having a value of 43 microfarads, with the low side of the capacitor C1 being grounded. C1 charges through resistor R2 when power supply 42 is turned on. C1 is included in the circuit to merely act as an energy reservoir because of the limitations of the particular power supply utilized and is in no way essential. The high voltage terminal of C1 is also connected via a doubling action network which comprises diode D1, for example an MR 1035 BR diode, and the parallel network with inductor L2 in one leg, with L2 for example having an inductance of 360 mh, and a series capacitor C2 and resistor R3, in the other leg. C2 is a 0.01 microfarad capacitor, and R3 is 10 kilohms. When the voltage across D1 reaches the breakdown voltage of the diode, the doubling network becomes conductive to charge the pulse forming network which comprises a series of inductors L3, L4, L5, L6 and L7, with capacitors C3, C4, C5, C6 and C7 respectively shunted across the individual inductors L3, L4, L5, L6. The low voltage side of the capacitors is grounded. The values of L3, L4, L5, L6 are 8 microhenries and the value of L7 is 4 microhenries. The values of capacitors C3 through C7 is 0.5 microfarad. This pulse forming network is designed to have a characteristic impedance of about 4 ohms, which is slightly greater than the dynamic impedance of the discharge device. This negative mismatch of the pulse forming network impedance to the load impedance will cause a reversed polarity potential pulse across the SCR at the end of the regular pulse discharge, thereby insuring rapid turn off of the SCR switching means, and thus insulating the discharge device from the recharging pulse forming network. Resistor R4 is in series with the pulse forming network and the anode of SCR-1 (thyristor) switching means 44, which is a 211-ZD SCR. The cathode of SCR-1 is connected in series with the anode of the discharge device. The switching means 44 is normally turned off, which isolates the pulse forming network from the discharge device until SCR-1 is gated, i.e., the switching means is closed.

The gate control power supply network 34 is connected across the gate and cathode of the SCR. The network 34 comprises a potential source, for example a 12 DC standard battery, switch S, the variable series resistor R5, and the series resistor R6, and the capacitor C8 shunted across the series resistance loaded high side of the capacitor also is connected to a four layer diode D3 the cathode of which also is connected to one primary input of a magnetic core transformer. The other primary input of the transformer is connected to the lower side of the shunt capacitor. One output terminal of the transformer secondary is series connected to resistor R7. The diode D4 is shunted across the resistor l oaded leg and the other output leg of the transformer secondary, with the cathode of D4 connected to the R7 loaded leg of the network. This leg of the network then has resistor R8 and capacitor C9 in parallel before being connected to the gate of the SCR. The cathode of the SCR is also connected to the anode of the diode D4, and the other leg of the transformer secondary.

The variable resistor R5 in this embodiment a 5 kilohm variable resistor, R6 is a 2.2 kilohm resistor. R5 is varied in value to provide a charging time for C8 such that the four layer diode D3 becomes conductive 175 times per second, which initiates the gate current which causes the SCR to become conductive 175 times per second.

When the SCR is turned on and is conductive, the pulse forming network discharges in about 20 microseconds through the discharge device. The energy input to the discharge device is about 0.75 joule per pulse.

While the discharge sustaining filling in the preferred embodiment lamp structure is xenon at about 300 torr, other selected inert gases such as argon and krypton, above or as mixtures can be utilized. The inert gas fill of xenon, argon, krypton or mixtures thereof can be varied from about 100-1200 torrs, as the specific structure of the capillary arc-tube is altered. If the discharge device is altered, its characteristic impedance will normally be charged and the pulse forming network can be adjusted to provide the necessary impedance mismatch desired. It is very important that the impedance of the pulse forming network be greater than the characteristic impedance of the discharge device to insure that a reversed polarity potential, from the initial polarity potential which supports the discharge, be across the SCR switching means shortly after the pulse discharge is initiated to insure rapid turnoff of the SCR. This provision of a reversed polarity potential pulse resulting from an impedance mismatch is well known in the art in pulse forming applications as seen from reference to the M.I.T. Radiation Laboratory Series text "waveforms," edited by Britton Chance et al., at page 742 of the republication by Dover Publications, 1965. The silicon controlled rectifier is a very convenient switching means, but a thryatron can be utilized as the switching means. The energy which can be expended in a pulse can be varied readily from about 0.25 to 2.5 joules, with a pulse length of from 5 to 50 microseconds, and with from 50 to 500 pulses per second.

The combination described in the foregoing specific example has been operated and it still continues to provide usable light output after over 150 hours at 175 pulses per second, with 0.75 joule per pulse, and with a 20 microsecond pulse width. The device is cooled by natural convection which facilitates optical coupling of the device. The provision of the keep-alive circuit which sustains a predetermined discharge in the flash lamp between power pulses eliminates the need for a high voltage starting spike which is generally used with flash lamps.

For the specific lamp described in the foregoing description a continuous "keep alive" discharge current of about 100 milliamps at about 60 volts, or an energy input of about 6 watts provided a sufficient level of ionization to insure that the pulse discharge was rapidly established when SCR-1 was turned on. This means that it is desired to provide a continuous energy input of approximately 0.01 watts per square mm of discharge path wall area.

While the invention has been described with reference to a specific combination, modification of the specific circuitry will be apparent to those skilled in the art. The invention is not to be limited to the detailed embodiment used by way of description.

I claim:

1. In combination, a discharge device and the pulse operational energizing means therefor, said combination comprising:

a. a capillary discharge device having a light-transmissive envelope, electrodes operatively disposed proximate opposite ends of said envelope, lead-in conductors sealed through said envelope and electrically connected to said electrodes, and one of said electrodes coated with electron emissive material to function as a cathode;

b. a pulse generating means electrically connected across the lead-in conductors of said discharge device, and a fast-acting repetitively operable switching means connecting said pulse generating means to said discharge device, said pulse generating means comprising a power supply and a pulse forming network, said pulse forming network having an impedance which is slightly greater than the impedance of said discharge device, and said switching means when closed having the polarity thereacross reversed shortly after said discharge device is pulsed thereby causing said switching means to turn off and terminate and individual pulse and permit said pulse forming network to recharge from said power supply;

c. control means for applying a signal to said switching means to close same in a very fast repetitive mode for a predetermined number of times per second; and d. a discharge device keep-alive reactive network and supplemental power supply connected across the electrodes of said discharge device to sustain therethrough a continuous small intensity discharge.

2. The combination as specified in claim 1, wherein said electrodes comprise two concentrically coiled tungsten members, with one member wound around the conductive lead-in and coated with said electron emissive material and the second concentric coil is tightly fitted over the first coil so that substantially all of said electron emissive material is covered and shielded from said discharge.

3. The combination as specified in claim 1, wherein said discharge sustaining filling consists essentially of selected inert gas from 100—1200 torr.

4. The combination as specified in claim 1, wherein said pulse discharge energy input is from about 0.25 to 2.5 joule per pulse.

5. The combination as specified in claim 1, wherein said control means signal opens and closes said switching means to provide a pulse discharge period of from 5 to 50 microseconds and a pulse repetition rate of from 50 to 500 pulses per second.

6. The combination as specified in claim 1, wherein the power input wall loading 17 watts/cm$^2$ of discharge path wall area.

7. The combination as specified in claim 1, wherein said discharge maintained by said keep-alive network supplies a continuous energy loading of approximately 0.01 watts per square millimeter of discharge path wall area.